United States Patent
Hsu et al.

(10) Patent No.: US 10,656,365 B2
(45) Date of Patent: May 19, 2020

(54) TWIN-LENS MODULE HAVING FIRST AND SECOND LENS-MAINTAINING COMPONENTS

(71) Applicant: TDK TAIWAN CORP., Yangmei, Taoyuan (TW)

(72) Inventors: Shang-Yu Hsu, Yangmei Taoyuan (TW); Yu-Cheng Lin, Yangmei Taoyuan (TW)

(73) Assignee: TDK Taiwan Corp., Yangmei Taoyuan (TW)

( * ) Notice: Subject to any disclaimer, the term of this patent is extended or adjusted under 35 U.S.C. 154(b) by 50 days.

(21) Appl. No.: 15/350,873

(22) Filed: Nov. 14, 2016

(65) Prior Publication Data

US 2017/0160513 A1 Jun. 8, 2017

Related U.S. Application Data

(60) Provisional application No. 62/264,557, filed on Dec. 8, 2015.

(30) Foreign Application Priority Data

Sep. 7, 2016 (TW) ............................... 105128871 A

(51) Int. Cl.
  *G02B 7/02* (2006.01)
  *G02B 7/04* (2006.01)
  (Continued)

(52) U.S. Cl.
  CPC ............... *G02B 7/021* (2013.01); *G02B 7/08* (2013.01); *G02B 27/646* (2013.01); *G03B 35/08* (2013.01)

(58) Field of Classification Search
  CPC . G02B 3/00; G02B 7/00; G02B 7/002; G02B 7/02; G02B 7/021; G02B 7/04; G02B 7/08; G02B 21/18; G02B 21/20; G02B 23/00; G02B 23/16; G02B 25/00; G02B 25/001; G02B 25/002; G02B 25/004;
  (Continued)

(56) References Cited

U.S. PATENT DOCUMENTS 6,385,146 B1 * 5/2002 Choi .................. G11B 7/093
                                                    359/814
8,049,815 B2  11/2011 Huang et al.
(Continued)

FOREIGN PATENT DOCUMENTS

CN   103018871 A   4/2013
TW   I509340 B    11/2015

OTHER PUBLICATIONS

Office Action dated Apr. 18, 2017 in corresponding TW Application No. 105128871, 5 pages.

*Primary Examiner* — Ryan S Dunning
(74) *Attorney, Agent, or Firm* — Muncy, Geissler, Olds & Lowe, P.C.

(57) ABSTRACT

A twin-lens module includes a first lens-maintaining component and a second lens-maintaining component. The first lens-maintaining component includes at least one first magnet which is arranged on two sides of the first lens. The second lens-maintaining component includes at least one second magnet which is arranged surrounding the second lens. A portion of the first magnet and/or the second magnet are multipolar magnets.

15 Claims, 8 Drawing Sheets

(51) Int. Cl.
*G02B 27/64* (2006.01)
*G02B 7/08* (2006.01)
*G03B 35/08* (2006.01)

(58) Field of Classification Search
CPC .. G02B 25/005; G02B 27/646; G03B 11/046; G03B 2205/0007; H04N 5/2253; H04N 5/23287
USPC ............ 348/208.11; 359/362, 373, 374, 480, 359/481, 557, 600, 808, 811, 819; 396/55
See application file for complete search history.

(56) References Cited

U.S. PATENT DOCUMENTS

| | | | |
|---|---|---|---|
| 2007/0154198 A1* | 7/2007 | Oh .................... | G02B 7/102 396/85 |
| 2008/0192365 A1* | 8/2008 | Takeshita ............. | G11B 7/0932 359/811 |
| 2009/0195898 A1* | 8/2009 | Naitou .................. | G03B 13/34 359/824 |
| 2014/0355120 A1* | 12/2014 | Yeo ...................... | G03B 3/10 359/557 |
| 2016/0018720 A1* | 1/2016 | Bachar .................. | G02B 7/08 359/824 |
| 2017/0094187 A1* | 3/2017 | Sharma ................. | G02B 7/09 |

* cited by examiner

TWIN-LENS MODULE HAVING FIRST AND SECOND LENS-MAINTAINING COMPONENTS

CROSS REFERENCE TO RELATED APPLICATIONS

This Application claims priority claims priority of provisional U.S. Patent Application Ser. No. 62/264,557 filed Dec. 8, 2015 and Taiwan Patent Application No. 105128871 filed on Sep. 7, 2016, the entirety of which is incorporated by reference herein.

BACKGROUND OF THE INVENTION

Field of the Invention

The disclosure generally relates to a twin-lens module, and more particularly, to a twin-lens module utilizing modified magnets so that the two lenses can focus independently without affecting each other.

Description of the Related Art

In recent years, two-lens modules have found wide application in various kinds of electronic devices, so that users can perform various kinds of photography such as 3D photography or deep-field photography. Generally, the interaction between magnet and coil is utilized to move the lens via the twin-lens module. When the two lenses move or focus independently, preventing the movement of one lens from being affected by the movement of the other lens becomes an important issue. Therefore, a twin-lens module with modified magnets such as multipolar magnets is needed to solve the aforementioned problems.

BRIEF SUMMARY OF THE INVENTION

In order to solve the aforementioned problem, the invention proposes a twin-lens module which utilizes modified magnets such as multipolar magnets or the combination with normal magnets, in order to prevent the movement of one lens from being affected by the movement of the other lens. Accordingly, the distance, parallelism, rotation/tile angel between the two lenses are effectively controlled and maintained.

In one aspect of the invention, a twin-lens module is provided by an embodiment of the present invention. The twin-lens module includes a first lens-maintaining component and a second lens-maintaining component. The first lens-maintaining component is utilized to maintain a first lens. The first lens-maintaining component comprises at least one first magnet, and the first magnet is arranged on two sides of the first lens. The second lens-maintaining component is utilized to maintain a second lens. The second lens-maintaining component comprises at least one second magnet, the second magnet is arranged on two sides of the second lens, and a portion of the first magnet and/or the second magnet is a multipolar magnet. In another embodiment, each of the first magnet and the second magnet is a multipolar magnet.

In another aspect of the invention, the remaining portion of the first magnet and the second magnet is a modified normal magnet, and the N pole and S pole of the modified normal magnet are interleaved. In another embodiment, each of the first magnet and the second magnet is a multipolar magnet. A magnetic-shield plate is arranged between the first lens-maintaining component and the second lens-maintaining component. An optical image stabilization (OIS) system is utilized by the twin-lens module. The focus of the first lens and the focus of the second lens are independent.

Other aspects and features of the present invention will become apparent to those with ordinarily skill in the art upon review of the following descriptions of specific embodiments of the twin-lens module.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

Figure 1:
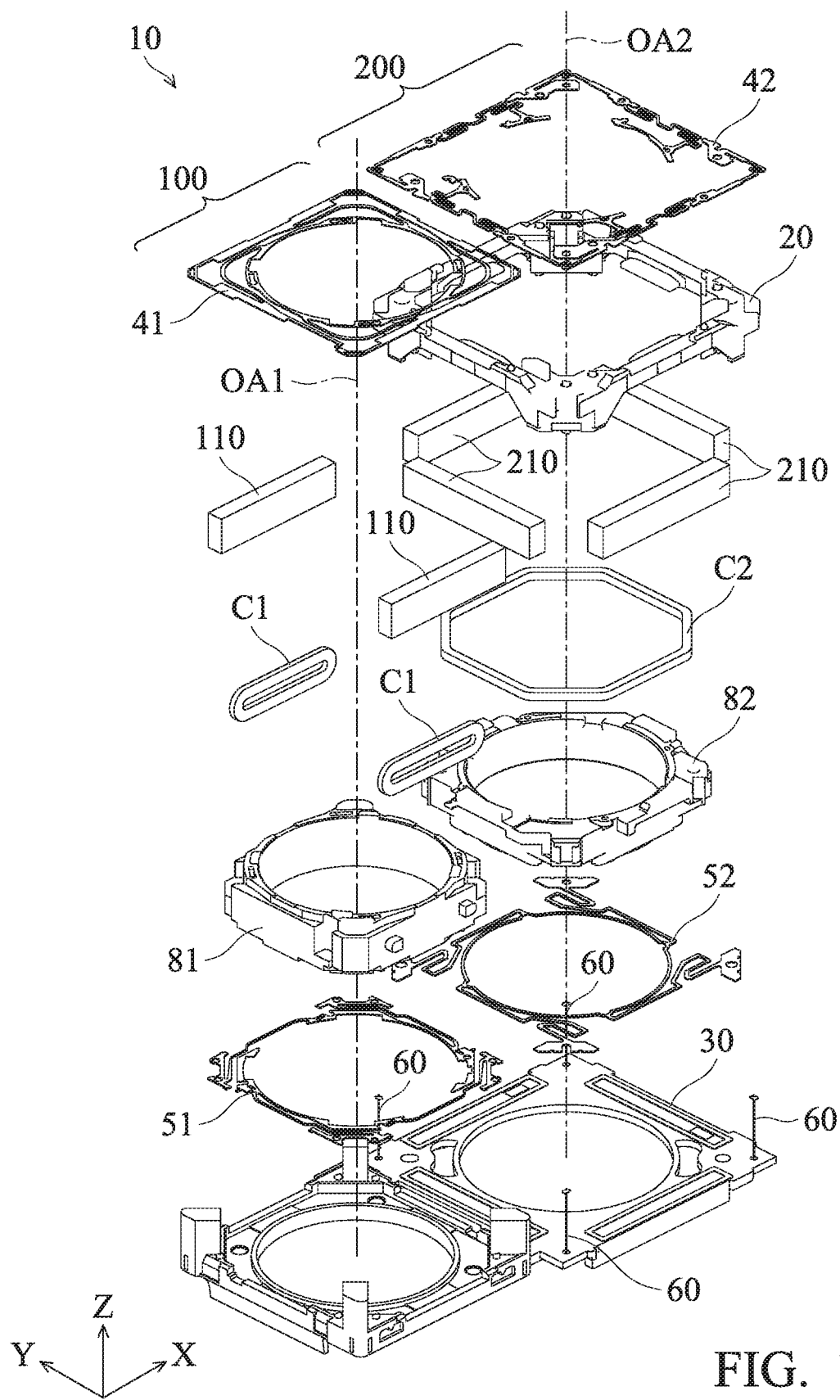
FIG. 1 is a mechanical schematic of a twin-lens module according to an embodiment of the invention.

FIG. 1 is a mechanical schematic of a twin-lens module 10 according to an embodiment of the invention. The twin-lens module 10 includes a first lens-maintaining component 100 and a second lens-maintaining component 200. As shown in FIG. 1, the twin-lens module 10 primarily includes a rectangular frame 20, a base 30, upper springs 41 and 42, lower springs 51 and 52, a plurality of suspension wires 60, holders 81 and 82, first coils C1, a second coil C2, first magnets 110, and second magnets 210. The first coils C1 may have elliptical structures, and the second coil C2 may have a multi-shape structure. Specifically, as shown I FIG. 1, the first coils C1 are arranged on two sides of the holder 81, and the second coil C2 is arranged so that it surrounds the holder 82.

It should be appreciated that an image detecting unit (not shown), such as charge-coupled device (CCD), is disposed below and fixed to the base 30. Moreover, an optical lens (not shown) is disposed in the holder 10 and is positioned corresponding to the image detecting unit. The base 30 is substantially perpendicular to the optical axis OA1 and OA2 (these two axes are parallel to the Z axis) of the optical lens. With the optical lens and the image detecting unit, the camera can be used for photography or recording video. Additionally, the optical image stabilization mechanism between the optical lens and the image detecting unit can rapidly correct the horizontal deviation of the optical axis OA1 and OA2 and the optical lens along the X and Y axes, so as to compensate for image blur and obtain a better quality image.

In one embodiment, the holder 81 is connected to the upper spring 41, the holder 82 is connected to the upper spring 42, and the upper spring 42 is connected to the frame 20. Furthermore, the holder 82 is connected to the lower spring 52, and the lower spring 52 is connected to the frame 20. Hence, when the frame 20 is impacted by an external force, the holders 81 and 82 can move with respect to the frame 20 along the Z axis through the upper springs 41 and 42 and lower springs 51 and 52, and the vibration of the camera can be efficiently absorbed along the vertical direction (Z axis), so as to avoid unintentional damage being done to the holders 81 and 82 and the optical lens disposed therein. Moreover, in this embodiment, an end of the suspension wire 60 is connected to the frame 20 by soldering, and the other end of the suspension wire 60 is connected to the base 30 by soldering. Thus, the frame 20 can move with respect to the base 30 along the direction with respect to the XY plane when impacted by an external force, and the horizontal vibration of the camera can also be efficiently absorbed.

Figure 2:
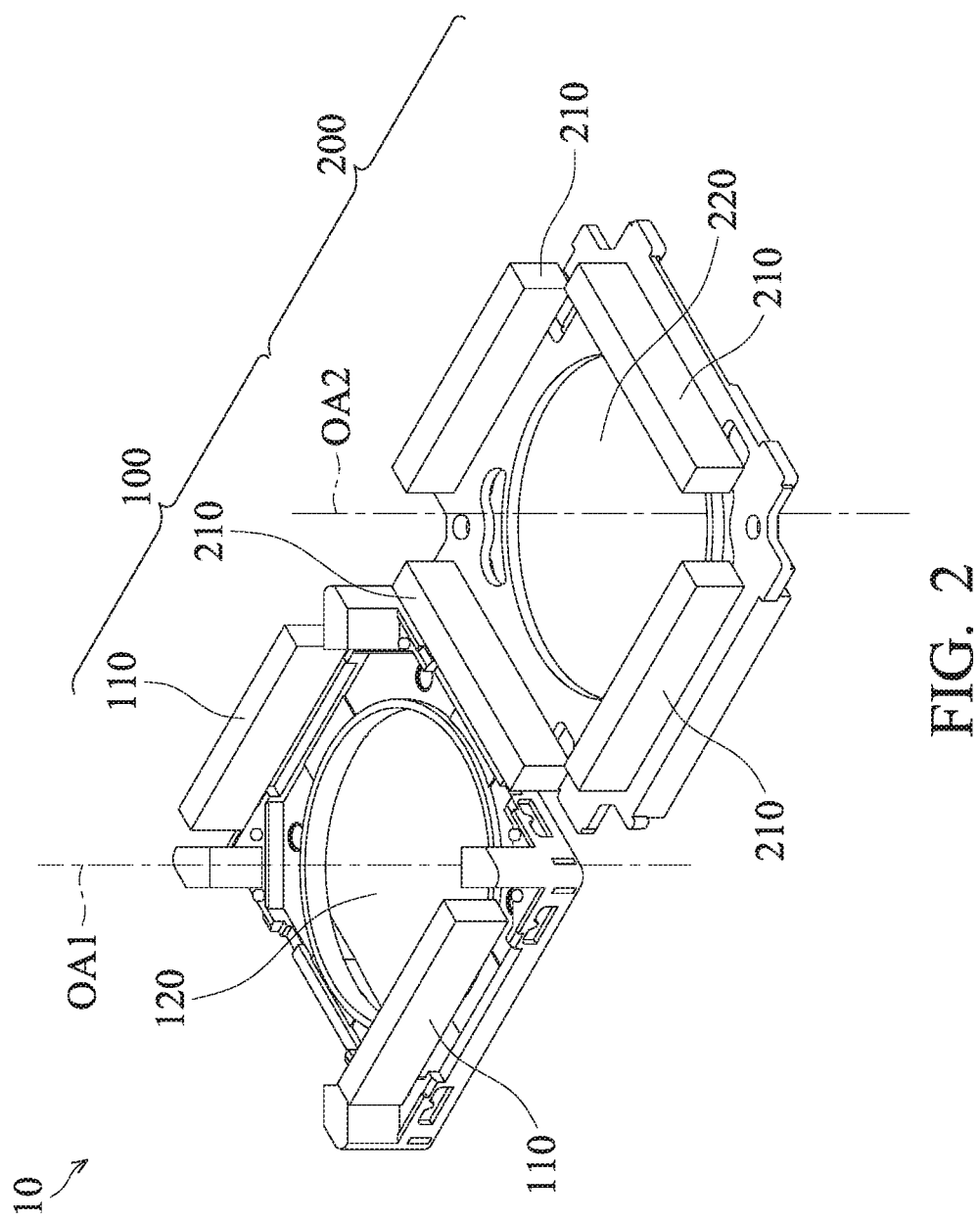
FIG. 2 is a schematic of a twin-lens module according to another embodiment of the invention.

FIG. 2 is a schematic of a twin-lens module 10 according to another embodiment of the invention. As shown in FIG. 2, the twin-lens module 10 includes a first lens-maintaining component 100 and a second lens-maintaining component 200. A first hollow region 120 of the first lens-maintaining component 100 is utilized to contain a first lens (not shown). Therefore, the first lens-maintaining component 100 can maintain the first lens. The first lens-maintaining component 100 further includes at least one first magnet 110, and the first lens 110 is arranged on two sides of the first lens. In other words, the first lens 210 is arranged on two sides of the first hollow region 120. A second hollow region 220 of the first lens-maintaining component 200 is utilized to contain a second lens (not shown). Therefore, the second lens-maintaining component 200 can maintain the second lens. The second lens-maintaining component 100 further includes at least one second magnet 210, and the second magnet 210 is arranged so that it is surrounding the second lens. In other words, the second magnet 210 is arranged to surround the second hollow region 220.

It should be noted that a portion of the first magnets 110 and/or the second magnets 210 are multipolar magnets. In one embodiment, the first magnet 110 of the twin-lens module 10 is a multipolar magnet, and the second magnet 210 is a normal magnet (which means that it is not a multipolar magnet). In another embodiment, each of the first magnet 110 and the second magnet 210 is a multipolar magnet. Compared to the normal magnet, the magnetic distribution of the two sides of the multipolar magnet is more closed and limited. As such, the magnetic distribution of the multipolar magnet is smaller and narrower than that of the normal magnet. Therefore, utilizing the multipolar magnet can prevent the lens of the twin-lens module 10 from being affected by another lens.

In one embodiment, the twin-lens module 10 further includes a sensor (not shown). For example, the sensor could be a Hall sensor. When users utilize the electronic device which includes the twin-lens module 10, the sensor could detect the vibration and movement of the twin-lens module 10. Therefore, the twin-lens module 10 could utilize an optical image stabilization (OIS) system.

In addition, the twin-lens module 10 further includes a first coil, a second coil and a spring plate. Force is generated by the first coil and the first magnet 110 so that the first lens can move upward and downward along the optical axis OA1 in order to focus. Accordingly, the first actuator of the twin-lens module 10 is formed. Specifically, the first actuator is a voice coil motor (VCM). Furthermore, force is generated by the second coil and the second magnet 210 so that the second lens can move upward and downward along the optical axis OA2 in order to focus. Accordingly, the second actuator of the twin-lens module 10 is formed. The spring plate is utilized to clamp the first lens-maintaining component 100 and the second lens-maintaining component 200, so that the first lens and the second lens can move along the axis OA1 and OA2.

Therefore, regarding the twin-lens module 10, the focus of the first lens and the focus of the second lens are independent. Furthermore, since the first lens-maintaining component 100 and the second lens-maintaining component 200 are arranged on the same twin-lens module 10, the relative position, distance, parallelism, rotation/tile angel between the first lens-maintaining component 100 and the second lens-maintaining component 200 are fixed. Therefore, no matter how the first lens-maintaining component 100 and the second lens-maintaining component 200 are operated, controlled, or affected by outside vibrations, the axis OA1 and OA2 can maintain the same direction. In addition, because the multipolar magnet is utilized by the twin-lens module 10, the movement of lenses of the twin-lens module 10 can be prevented from being affected by the other lens, and the focus can accordingly be accurate and stable.

Figure 3B:
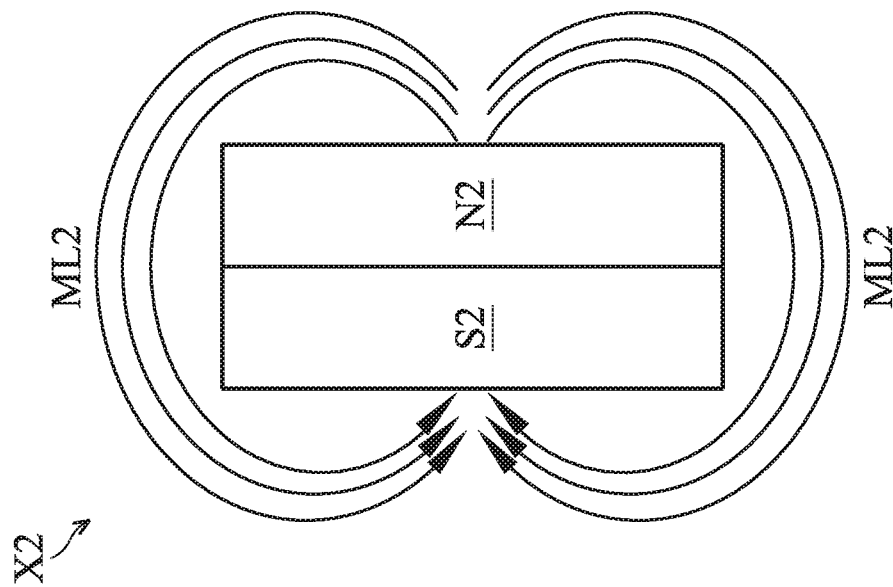
FIG. 3B is a schematic of a normal magnet according to an embodiment of the invention.
Figure 3A:
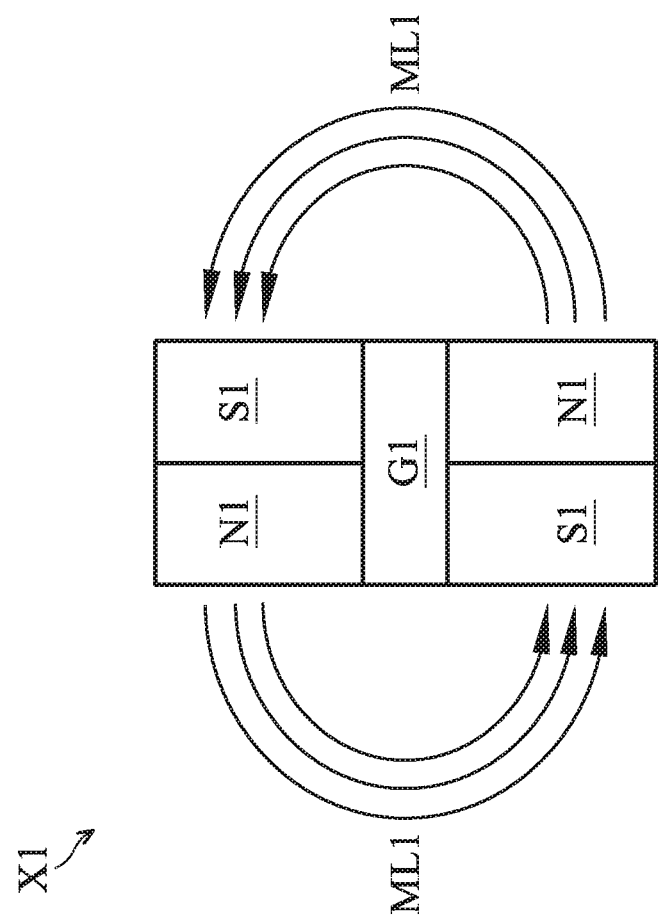
FIG. 3A is a schematic of a multipolar magnet according to an embodiment of the invention.
Figure 3C:
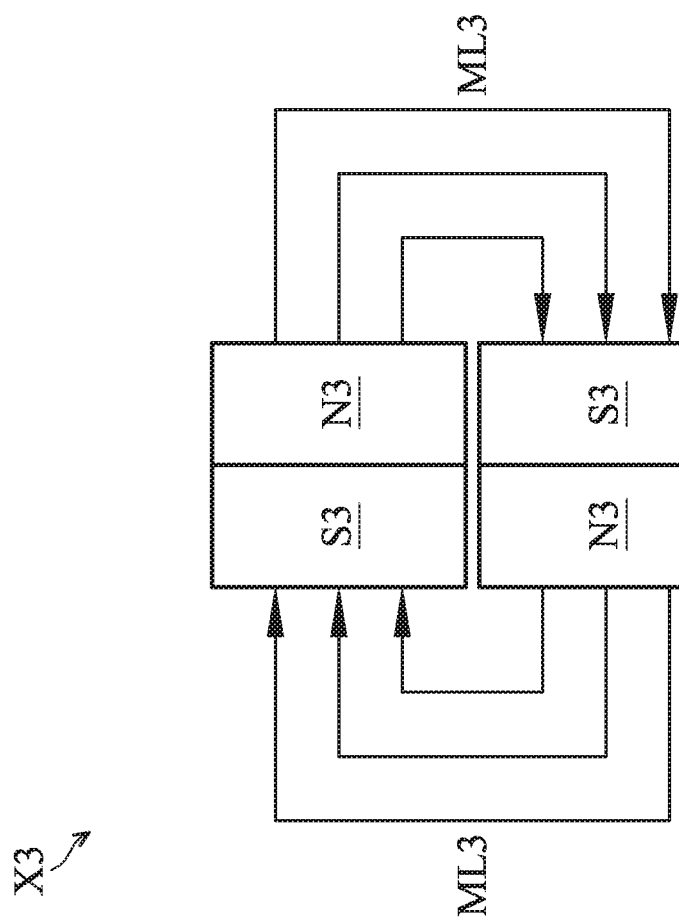
FIG. 3C is a schematic of a modified normal magnet according to an embodiment of the invention.
Figure 3D:
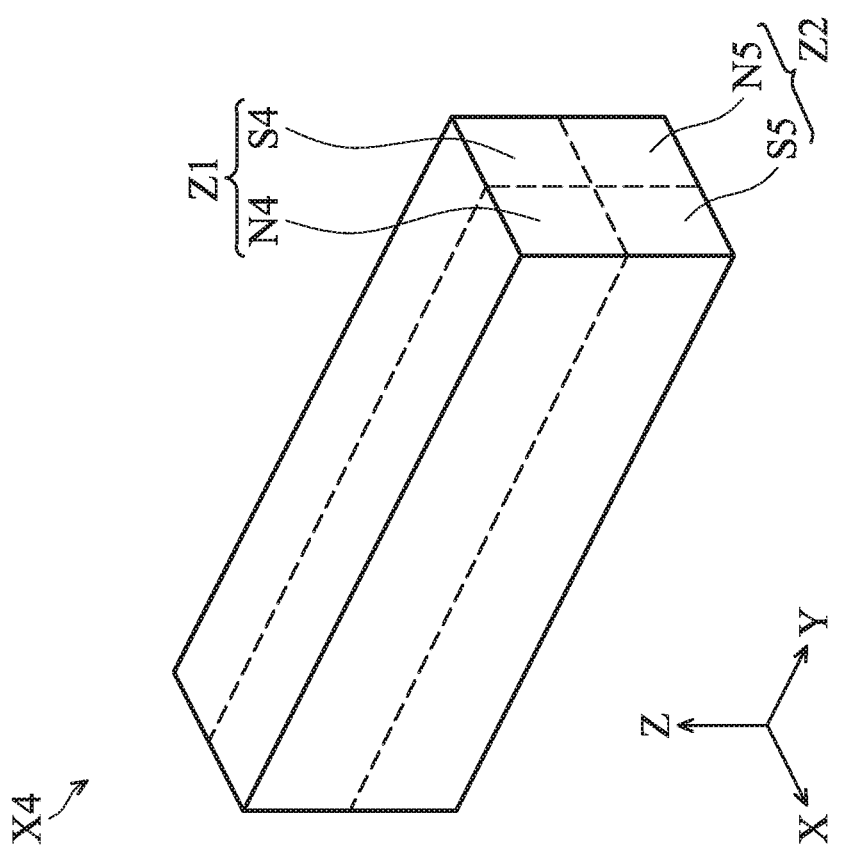
FIG. 3D is a schematic of a multipolar magnet according to another embodiment of the invention.

FIGS. 3A, 3B, 3C and 3D are schematics of multipolar magnets X1 and X4 and normal magnets X2 and X3 according to embodiments of the invention. The N pole (N1) and the S pole (S1) of the multipolar magnet X1 is interleaved, which is different from the N pole (N2) and the S pole (S2) of the normal magnet X2. There is a gap G1 between the N1 and S1, and N2 and S2 of the multipolar magnet X1. Because the structure of the multipolar magnet X1 is different from that of the normal magnet X2, the distribution of magnetic line ML of two sides of the multipolar magnet X1 is more closed and narrower than that of the normal magnet X2. Specifically, movements of the first lens and the second lens are actuated by the interaction of the magnets and coils. The effective region of the magnet line ML of the multipolar magnet X1 is smaller than the effective region of the magnet line ML of the normal magnet X2. Therefore, the interference for the movement of another lens could be avoided by utilizing the multipolar magnet X1, and the accuracy and the stabilization of focus of the twin-lens module 10 could be improved. In the embodiment of FIG. 2C, the N pole (N3) and S pole (S3) of the modified normal magnet X3 is interleaved, which is different from the arrangement of the N pole (N2) and S pole (S2) of the normal magnet X2. Because the magnetic distribution of connection part of the modified normal magnet X3 is larger than that of the multipolar magnet X1, the size of the non-magnetic region could be reduced and the magnetic linearity could be increased by the modified normal magnet X3. FIG. 3D illustrated another type of multipolar magnet X4, whose N poles (N4, N5) and S poles (S4, S5) are interleaved. It should be noted that, N4 and S4 constitute the first magnetic zone Z1, N5 and S5 constitute the second magnetic zone Z2, and the multipolar magnet X4 could be divided into the first magnetic zone Z1 and the second magnetic zone Z2 along the axis direction (Z axis).

Figure 4A:
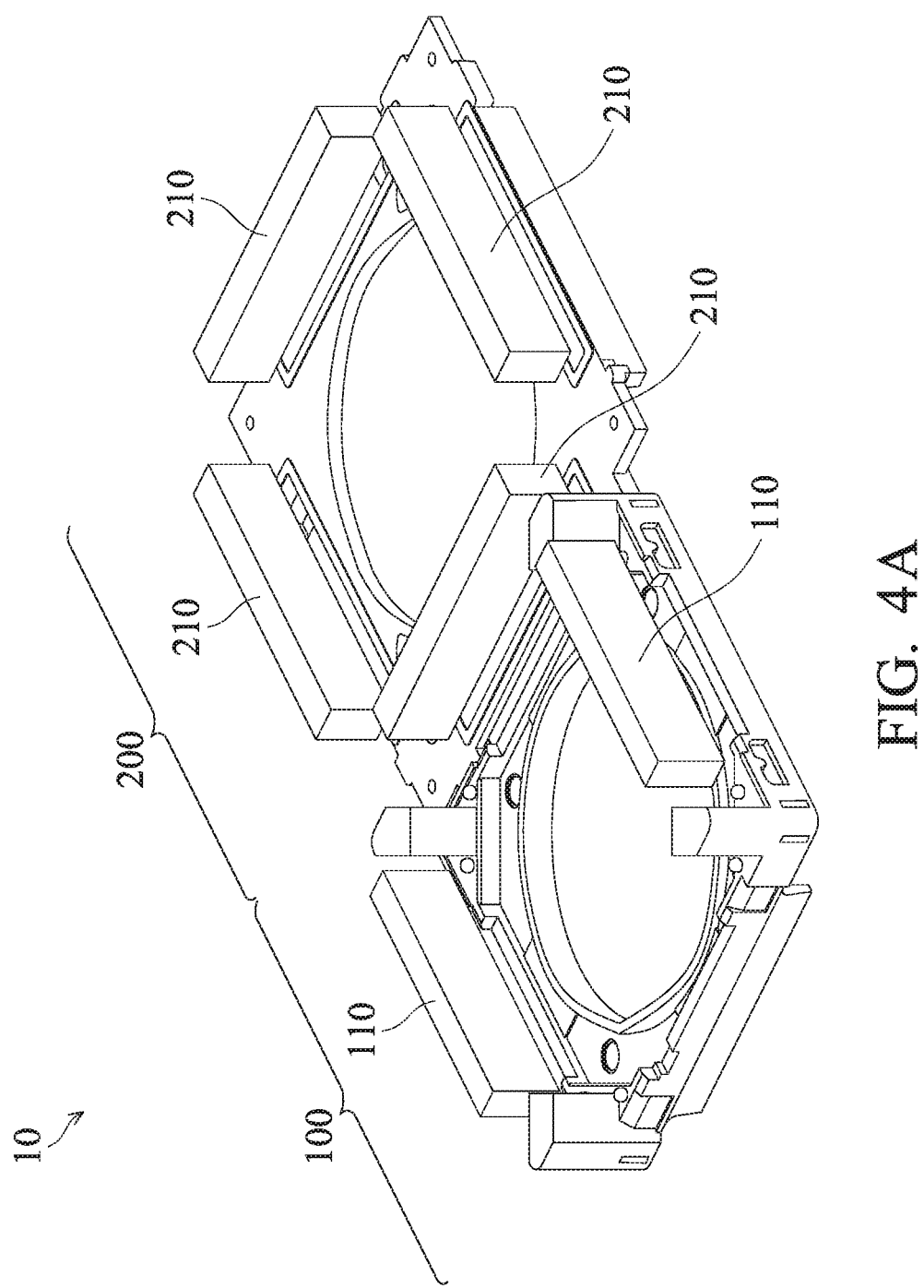
FIGS. 4A, 4B and 4C are schematics of a twin-lens module according to an embodiment of the invention.
Figure 4B:
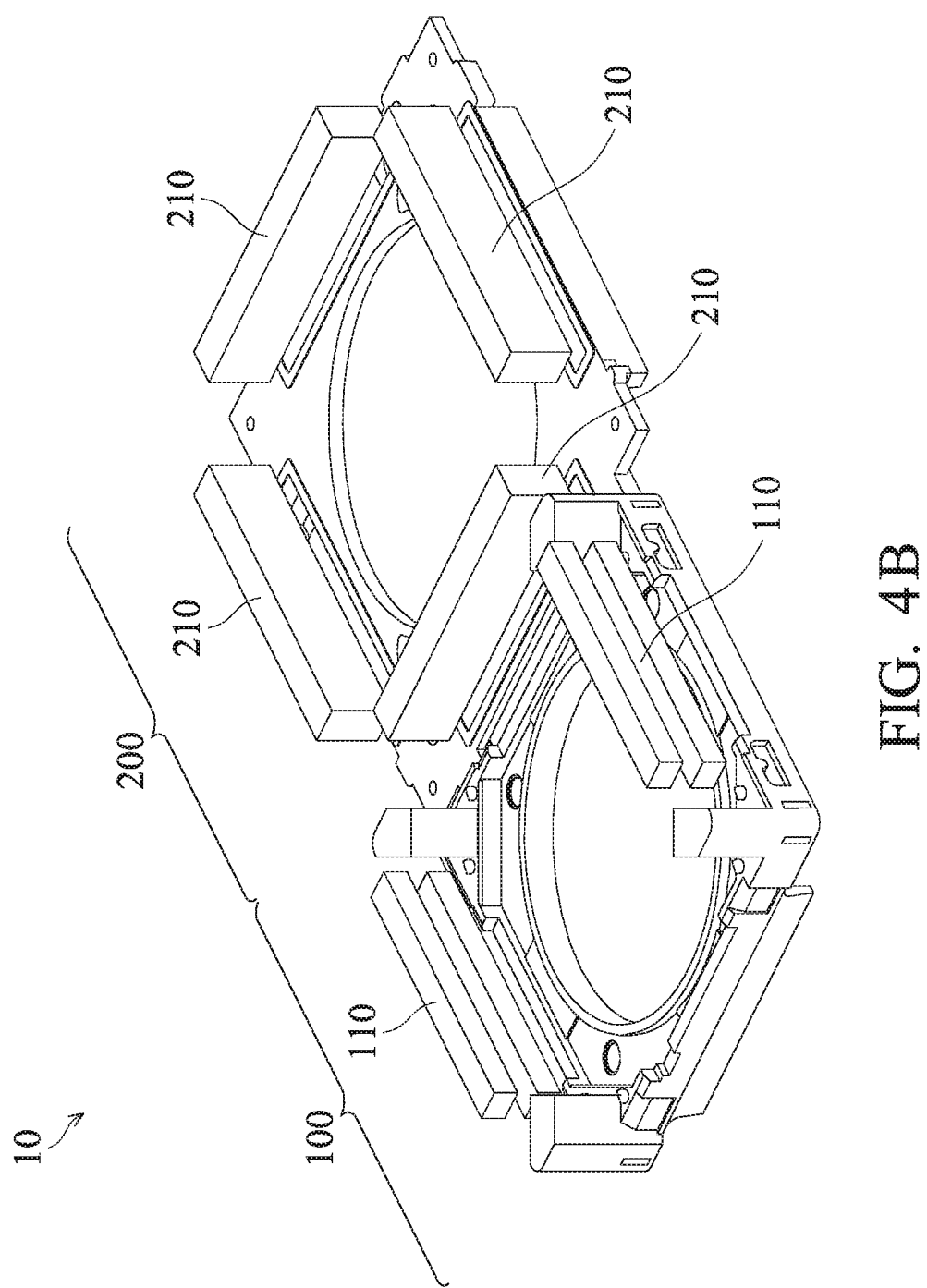
Figure 4C:
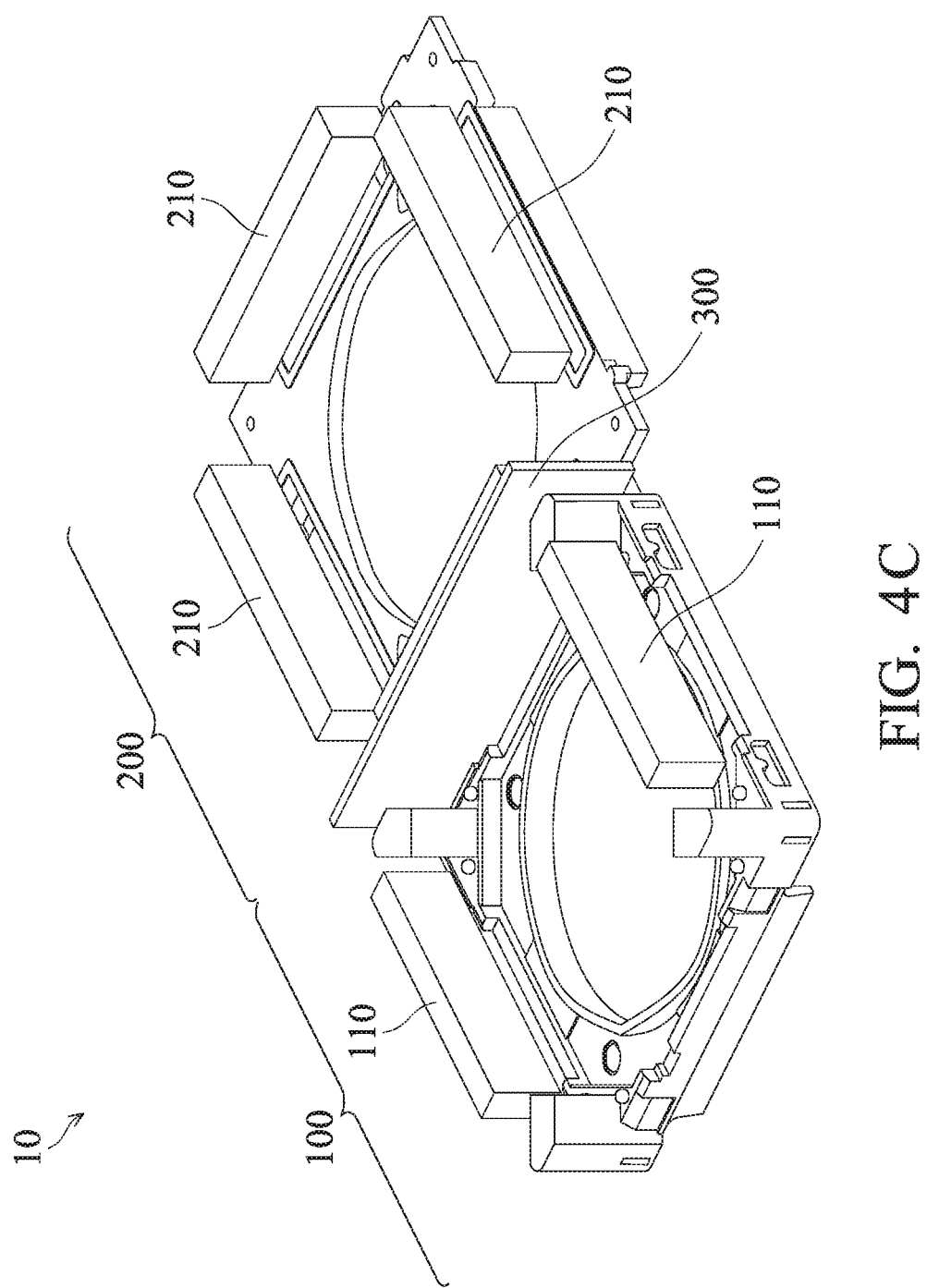

FIGS. 4A, 4B and 4C are schematics of a twin-lens module 10 according to an embodiment of the invention. In the embodiment of 4A, each of the first magnet 110 and the second magnet 210 is a multipolar magnet. In the embodiment of FIG. 4B, the first magnet 110 of the first lens-maintaining component 100 is a modified normal magnet, and the second magnet 210 of the second lens-maintaining component 220 is a multipolar magnet. The structure of the modified normal magnet is illustrated in FIG. 3C, and will not be repeated again. It should be noted that the second magnet 210 between the first lens-maintaining component 100 and the second lens-maintaining component 200 is arranged to be closer to the second lens. In other words, the second magnet 210 between the first lens-maintaining component 100 and the second lens-maintaining component 200 is far from the first lens and close to the second lens. In the embodiment of FIG. 4C, a magnetic-shield plate 300 is arranged between the second magnet 210 between the first lens-maintaining component 100 and the second lens-maintaining component 200 in order to shield the magnetic field between the first magnet 110 and the second magnet 210. The magnetic-shield plate 300 could be composed of metal material, or mainly composed of plastic and partially composed of metal (such as electroplating metal thin film on a plastic surface, doping metal powder in the plastic material, or embedding metal into the plastic material). Due to the arrangement of the magnetic-shield plate 300, the magnetic field of the first magnet 110 will not affect that of the second magnet 210, and the magnetic field of the second magnet 210 will not affect that of the first magnet 110. Therefore, the movement of a lens can be prevented from being affected by the movement of the other lens.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A twin-lens module, comprising:
a first lens-maintaining component, utilized to maintain a first lens, wherein the first lens-maintaining component comprises a first holder, a first fixed part and a first actuator module, the first holder configured to connect the first lens, the first holder is moveable relative to the first fixed part, the first actuator module is configured to drive the first lens to move, the first actuator module comprises at least one first magnet, and the first magnet is arranged on two sides of the first lens and the two sides are not adjacent to each other, the first lens-maintaining component comprises a rectangle structure having a first side; and
a second lens-maintaining component, utilized to maintain a second lens, wherein the second lens-maintaining component comprises at least one second magnet, the second magnet is arranged on two sides of the second lens, and a portion of the first magnet and/or the second magnet is a multipolar magnet, wherein the first lens has a first optical axis, the second lens has a second optical axis, the first optical axis and the second optical axis are parallel to each other and not overlapping with each other, and distance between the first optical axis and the second optical axis is not zero, and the first magnet comprises a strip structure which extends along an arrangement direction of the first lens and the second lens, the first magnet is arranged at the first side, and the strip structure of the first magnet is parallel with the first side, wherein the first magnet and the first lens do not overlap when observed along the arrangement direction, wherein the first lens-maintaining component only drive the first lens to move relative to the first fixed part along the first optical axis, and the first lens-maintaining component does not drive the first lens to move relative to the first fixed part along a direction which is perpendicular to the first optical axis.

2. The twin-lens module as claimed in claim 1, wherein the remaining portion of the first magnet and/or the second magnet is a modified normal magnet, and N pole and S pole of the modified normal magnet are interleaved.

3. The twin-lens module as claimed in claim 1, wherein each of the first magnet and the second magnet is a multipolar magnet.

4. The twin-lens module as claimed in claim 1, wherein a magnetic-shield plate is arranged between the first lens-maintaining component and the second lens-maintaining component.

5. The twin-lens module as claimed in claim 1, wherein an optical image stabilization (OIS) system is utilized by the twin-lens module.

6. The twin-lens module as claimed in claim 1, wherein focus of the first lens and focus of the second lens are independent.

7. The twin-lens module as claimed in claim 6, wherein the first lens-maintaining component further comprises at least one first coil, and the second lens-maintaining component further comprises at least one second coil.

8. The twin-lens module as claimed in claim 7, wherein the first coil is arranged on two sides of a first holder of the first lens-maintaining component, and the second coil is arranged on two sides of a second holder of the second lens-maintaining component.

9. The twin-lens module as claimed in claim 1, wherein the multipolar magnet(s) is/are divided into a first magnetic zone and a second magnetic zone along the first optical axis or the second optical axis.

10. The twin-lens module as claimed in claim 1, wherein a portion of the second magnet is arranged between the position of the first lens and the position of the second lens and wherein the portion of the second magnet is closer to the position of the second lens than the position of the first lens.

11. A twin-lens module, comprising:
a first lens-maintaining component, configured to drive a first lens with a first optical axis, the first lens-maintaining component comprises:
   a first holder, configured to connect the first lens;
   a first fixed part, the first holder is movable relative to the first fixed part; and
   a first actuator module, configured to drive the first holder to move relative to the first fixed part, the first actuator module comprises:
      a first magnet, fixedly disposed at the first fixed part; and
      a first coil, corresponding to the first magnet; and
a second lens-maintaining component, configured to drive a second lens with a second optical axis, wherein the first optical axis and the second optical axis are parallel to each other and distance between the first optical axis and the second optical axis is not zero, the second lens-maintaining component comprises:
a second holder, configured to connect the second lens;
a second fixed part, the second holder is movable relative to the second fixed part; and
a second actuator module, configured to drive the second holder to move relative to the second fixed part, the second actuator module comprises:
   a second magnet, fixedly disposed at the second holder; and
   a second coil, corresponding to the second magnet,
wherein, the first fixed part and the second fixed part is fixedly connected to each other, and does not result in relative motion, and
wherein, the first lens-maintaining component only drive the first lens to move relative to the first fixed part along the first optical axis, and the first lens-maintaining component does not drive the first lens to move relative to the first fixed part along a direction which is perpendicular to the first optical axis.

12. The twin-lens module as claimed in claim 11, wherein the first magnet has a long axis which extends along an arrangement direction of the first optical axis and the second optical axis, and the first magnet and the first lens do not overlap when observed along the arrangement direction.

13. The twin-lens module as claimed in claim 12, wherein the first magnet has at least two pairs of magnetic poles.

14. The twin-lens module as claimed in claim 12, wherein the first magnet is composed of a plurality of normal magnets.

15. The twin-lens module as claimed in claim 11, wherein the first actuator module is configured to drive the first holder to move relative to the first fixed part along the first optical axis, and the second actuator module is configured to drive the second holder to move relative to the second fixed part along the second optical axis.

* * * * *